United States Patent
Ren et al.

(10) Patent No.: US 12,177,814 B2
(45) Date of Patent: Dec. 24, 2024

(54) LOW-COMPLEXITY PHYSICAL DOWNLINK CONTROL CHANNELS AND RELATED SIGNALING

(71) Applicant: QUALCOMM Incorporated, San Diego, CA (US)

(72) Inventors: Yuwei Ren, Beijing (CN); Huilin Xu, Temecula, CA (US); Peter Pui Lok Ang, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/596,072

(22) PCT Filed: Jun. 17, 2019

(86) PCT No.: PCT/CN2019/091471
§ 371 (c)(1),
(2) Date: Dec. 2, 2021

(87) PCT Pub. No.: WO2020/252612
PCT Pub. Date: Dec. 24, 2020

(65) Prior Publication Data
US 2022/0303951 A1    Sep. 22, 2022

(51) Int. Cl.
*H04W 72/04* (2023.01)
*H04W 72/02* (2009.01)
(Continued)

(52) U.S. Cl.
CPC ....... *H04W 72/02* (2013.01); *H04W 72/0446* (2013.01); *H04W 72/23* (2023.01); *H04W 72/51* (2023.01)

(58) Field of Classification Search
CPC . H04W 72/02; H04W 72/0446; H04W 72/51; H04W 72/23; H04W 72/085;
(Continued)

(56) References Cited

U.S. PATENT DOCUMENTS 10,666,334 B2    5/2020  Xiong et al.
2012/0113866 A1*  5/2012  Tenny .................. H04W 24/10
                                                       370/254
(Continued)

FOREIGN PATENT DOCUMENTS

CN    105359604 A    2/2016
CN    106454923 A    2/2017
(Continued)

OTHER PUBLICATIONS

International Search Report and Written Opinion—PCT/CN2019/091471—ISAEPO—Mar. 18, 2020.
(Continued)

*Primary Examiner* — Wei Zhao
(74) *Attorney, Agent, or Firm* — Patterson & Sheridan, L.L.P.

(57) ABSTRACT

Certain aspects of the present disclosure provide techniques for a low cost (LC) user equipment (UE) to signal to a base station (BS) capabilities to receive physical downlink control channels (PDCCHs) in wireless communications systems. In an exemplary method, a UE signals to a base station (BS) a plurality of parameters for physical downlink control channel (PDCCH) reception by the UE and receives a PDCCH according to the plurality of parameters.

29 Claims, 7 Drawing Sheets

(51) Int. Cl.
*H04W 72/0446* (2023.01)
*H04W 72/23* (2023.01)
*H04W 72/51* (2023.01)

(58) Field of Classification Search
CPC ... H04W 80/02; H04W 72/08; H04W 72/044; H04W 72/041; H04L 5/0048; H04L 5/0073; H04L 5/004; H04L 5/007
See application file for complete search history.

(56) References Cited

U.S. PATENT DOCUMENTS

| | | | |
|---|---|---|---|
| 2015/0049824 A1* | 2/2015 | Kim | H04B 7/0695 375/267 |
| 2016/0278103 A1* | 9/2016 | Kazmi | H04W 28/18 |
| 2017/0285621 A1 | 10/2017 | Pradas et al. | |
| 2017/0374653 A1 | 12/2017 | Lee et al. | |
| 2020/0359240 A1 | 11/2020 | Suzuki et al. | |
| 2021/0409174 A1* | 12/2021 | Yum | H04B 7/06 |

FOREIGN PATENT DOCUMENTS

| | | |
|---|---|---|
| CN | 104812073 B | 11/2018 |
| WO | 2015127669 A1 | 9/2015 |
| WO | 2019031850 A1 | 2/2019 |
| WO | 2019049928 A1 | 3/2019 |

OTHER PUBLICATIONS

Nokia, et al., "Beam Management-DCI Monitoring," R1-1610240, 3GPP TSG-RAN WG1 #86 Bis, Lisbon, Portugal, Oct. 10-14, 2016, Oct. 14, 2016 (Oct. 14, 2016), 3 Pages, Section 2.

Nokia, et al., "On Beam Management in NR—Procedures," R1-1610239, 3GPP TSG-RAN WG1 #86 Bis, Lisbon, Portugal, Oct. 10-14, 2016, Oct. 14, 2016 (Oct. 14, 2016), 4 Pages, Section 2.

Supplementary European Search Report—EP19933524—Search Authority—The Hague—Dec. 8, 2022.

* cited by examiner

LOW-COMPLEXITY PHYSICAL DOWNLINK CONTROL CHANNELS AND RELATED SIGNALING

CROSS-REFERENCE TO RELATED APPLICATIONS

This application is a national stage application under 35 U.S.C. 371 of PCT/CN2019/091471, filed Jun. 17, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for signaling capabilities of a low cost (LC) user equipment (UE) to receive physical downlink control channels (PDCCHs) in wireless communications systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a user equipment (UE). The method generally includes signaling to a base station (BS) a plurality of parameters for physical downlink control channel (PDCCH) reception by the UE and receiving a PDCCH according to the plurality of parameters.

Certain aspects provide a method for wireless communication performed by a base station (BS). The method generally includes receiving from a user equipment (UE) a plurality of parameters for physical downlink control channel (PDCCH) reception by the UE and transmitting a PDCCH to the UE according to the plurality of parameters.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for a low cost (LC) user equipment (UE) to signal to a base station (BS) capabilities to receive physical downlink control channels (PDCCHs) in wireless communications systems. Aspects of the present disclosure provide apparatus, methods, processing systems, and computer readable mediums for a base station (BS) to receive signaling from a user equipment (UE) regarding capabilities of the UE to receive physical downlink control channels (PDCCHs).

According to aspects of the present disclosure, lower tier 5$^{th}$ Generation (5G) UEs, also referred to as low complexity UEs or low cost (LC) UEs, may include low cost smart phones, wearables (e.g., smart watches), and relaxed Internet of things (IoT) devices (e.g., video surveillance cameras and drones). Lower tier UEs typically have lower costs and/or lower power consumption than other (e.g., standard) UEs (e.g., cell phones). A cell may be expected to support a large number of lower tier devices (i.e., more than a number of standard UEs supported by the cell). Designs for lower tier UEs may emphasize reduced complexity when compared to standard UEs, power savings when compared to standard UEs, and features supporting capacity improvements for the supporting wireless network to support the expected (large) number of lower tier UEs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Figure 1:
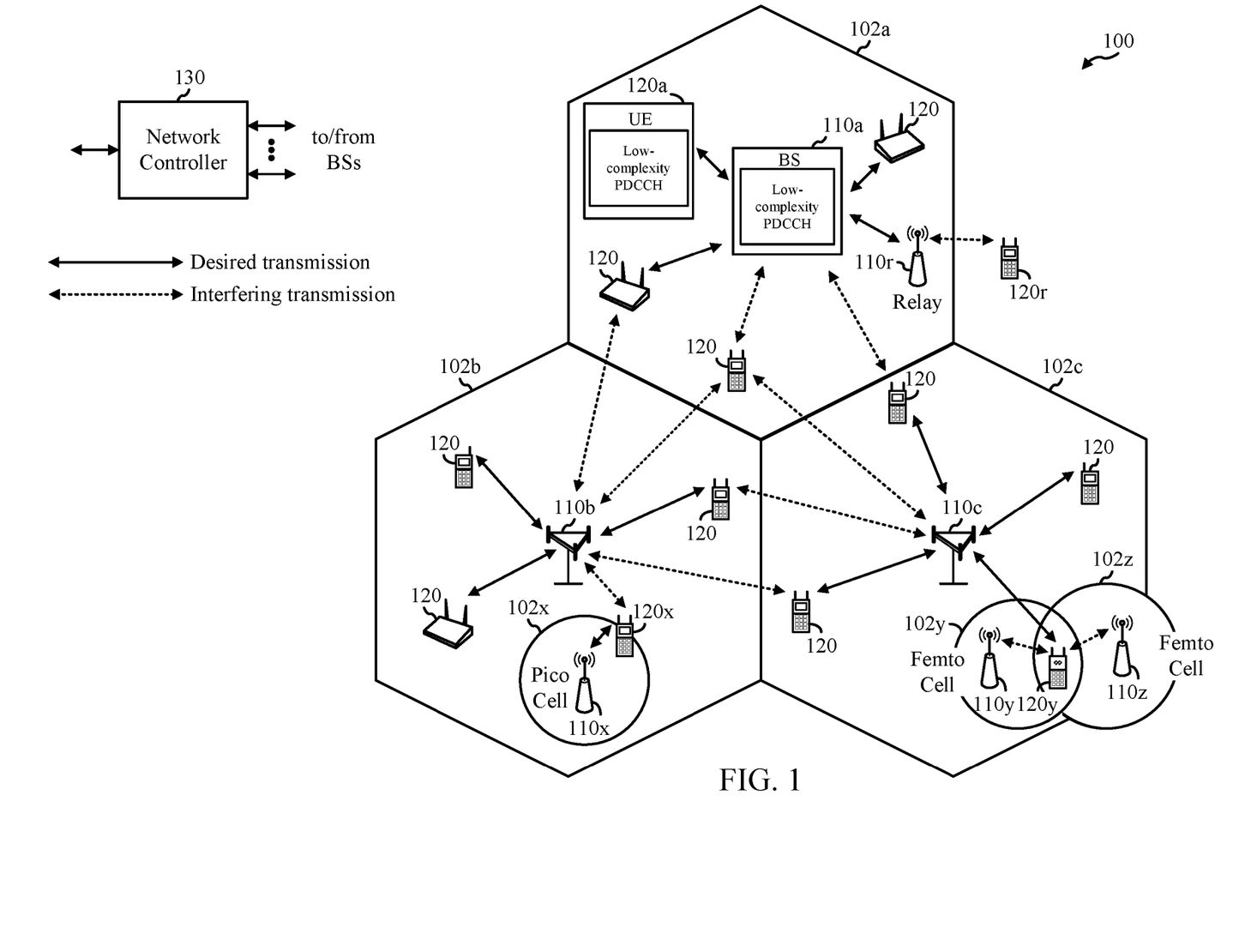
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network). For example, as shown in FIG. 1, the UE 120*a* has a low-complexity PDCCH module that may be configured for signaling to a base station (BS) a plurality of parameters for physical downlink control channel (PDCCH) reception by the UE and receiving a PDCCH according to the plurality of parameters, according to aspects described herein. For example, as shown in FIG. 1, the BS 110a has a low-complexity PDCCH module that may be configured for receiving from a user equipment (UE) a plurality of parameters for physical downlink control channel (PDCCH) reception by the UE and transmitting a PDCCH to the UE according to the plurality of parameters, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing (SCS). The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
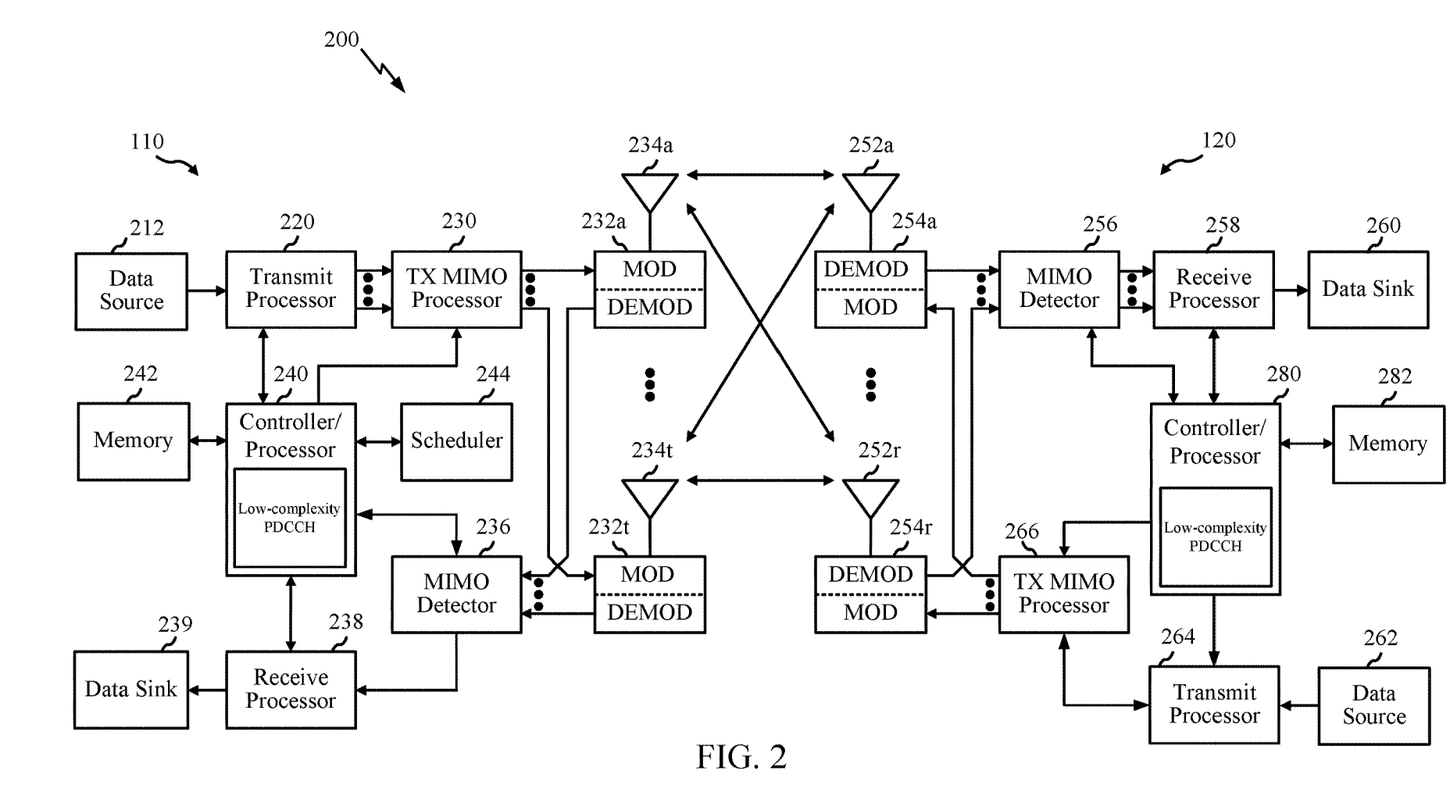
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a low-complexity PDCCH module that may be configured for receiving from a user equipment (UE) a plurality of parameters for physical downlink control channel (PDCCH) reception by the UE and transmitting a PDCCH to the UE according to the plurality of parameters, according to aspects described herein. For example, as shown in FIG. 2, the controller/processor 280 of the UE 120 has an low-complexity PDCCH module that may be configured for signaling to a base station (BS) a plurality of parameters for physical downlink control channel (PDCCH) reception by the UE and receiving a PDCCH according to the plurality of parameters, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Low-Complexity Physical Downlink Control Channels and Related Signaling

According to previously known techniques, a UE receives a PDCCH with blind detection. That is, the UE performs an exhaustive search for PDCCHs directed to the UE in all possible time-frequency locations (i.e., resource elements) that could be used to transmit a PDCCH to the UE. Possible time-frequency locations may be limited, for example, to resources within a search space that is configured for the UE and/or to resources at particular times which the UE is configured to monitor by a semi-persistent schedule (SPS). This exhaustive search typically causes the UE to utilize expensive hardware (e.g., a modem processor) and to experience high power consumption.

According to aspects of the present disclosure, design aspects of lower complexity PDCCHs are provided that may lower the complexity of searches for PDCCHs directed to lower tier UEs. The design aspects of lower complexity PDCCHs may include a maximum supported bandwidth for PDCCH reception, a maximum supported number of blind decodes (BD) and control channel elements (CCE) to be processed by a lower tier UE, a maximum supported number of downlink control information (DCI) to be buffered by a lower tier UE, a maximum supported number of DCI sizes to be processed by a lower tier UE, a maximum supported number of DCIs for unicast transmissions or receptions (i.e., grants) to be processed by a lower tier UE per slot, and a maximum supported number of DCIs for unicast transmissions or receptions (i.e., grants) to be processed by a lower tier UE per span of control symbols. In aspects of the present disclosure, one or more of the aforementioned design aspects may be reduced for lower tier UEs and thus enable reduced complexity in lower tier UEs.

In aspects of the present disclosure, different lower tier UEs may have different usages and corresponding requirements. For example, different lower tier UEs may support different maximum bandwidths.

In previously known techniques (e.g., 3GPP Release 15 (Rel-15) or NR), a maximum bandwidth supported by a UE (e.g., a cell phone) is reported by the UE in UE capability signaling during a radio resource control (RRC) connection setup. However, the bandwidth options in the report are limited to a single value for each subcarrier spacing (SCS) and frequency range, and thus a UE is unable to report any other maximum bandwidth.

According to aspects of the present disclosure, a UE (e.g., a lower tier UE) may report a parameter related to PDCCH reception (e.g., a maximum bandwidth, a maximum supported number of blind decodes (BD) and control channel elements (CCE), a maximum supported number of downlink control information (DCI) to be buffered, a maximum supported number of DCI sizes to be processed, a maximum supported number of DCIs for unicast transmissions or receptions (i.e., grants) per slot, or a maximum supported number of DCIs for unicast transmissions or receptions (i.e., grants) per span of control symbols) in a capabilities message transmitted to a base station during an RRC connection setup.

In aspects of the present disclosure, a UE may report (e.g., in a capabilities message, as described above) that the type of the UE is a lower tier UE, which may correspond to a set of values of one or more of the parameters (e.g., a maximum bandwidth, a maximum supported number of blind decodes (BD) and control channel elements (CCE), a maximum supported number of downlink control information (DCI) to be buffered, a maximum supported number of DCI sizes to be processed, a maximum supported number of DCIs for unicast transmissions or receptions (i.e., grants) per slot, or a maximum supported number of DCIs for unicast transmissions or receptions (i.e., grants) per span of control symbols) for PDCCH reception described above.

According to aspects of the present disclosure, a network standard or specification may specify a set of values of the parameters corresponding to the type of the UE described above, and a base station receiving the report of the type of the UE may refer to the network standard or specification to determine one or more of the values of the parameters and then transmit a PDCCH to the UE according to the determined one or more values.

In aspects of the present disclosure, a UE may report (e.g., in a capabilities message, as described above) an index of a set of values of one or more of the parameters (e.g., a maximum bandwidth, a maximum supported number of blind decodes (BD) and control channel elements (CCE), a maximum supported number of downlink control information (DCI) to be buffered, a maximum supported number of DCI sizes to be processed, a maximum supported number of DCIs for unicast transmissions or receptions (i.e., grants) per slot, or a maximum supported number of DCIs for unicast transmissions or receptions (i.e., grants) per span of control symbols) for PDCCH reception described above.

According to aspects of the present disclosure, a network standard or specification may specify a set of values of the parameters corresponding to the index reported by a UE as described above, and a base station receiving the report of the index may refer to the network standard or specification to determine one or more of the values of the parameters, based on the index, and then transmit a PDCCH to the UE according to the determined one or more values.

In aspects of the present disclosure, a UE may report (e.g., in a capabilities message, as described above) a specific value for one or more of the parameters (e.g., a maximum bandwidth, a maximum supported number of blind decodes (BD) and control channel elements (CCE), a maximum supported number of downlink control information (DCI) to be buffered, a maximum supported number of DCI sizes to be processed, a maximum supported number of DCIs for unicast transmissions or receptions (i.e., grants) per slot, or a maximum supported number of DCIs for unicast transmissions or receptions (i.e., grants) per span of control symbols) for PDCCH reception described above.

According to aspects of the present disclosure, a base station receiving the report of the specific value(s) for the one or more of the parameters may then transmit a PDCCH to the UE according to the reported specific value(s).

Figure 3:
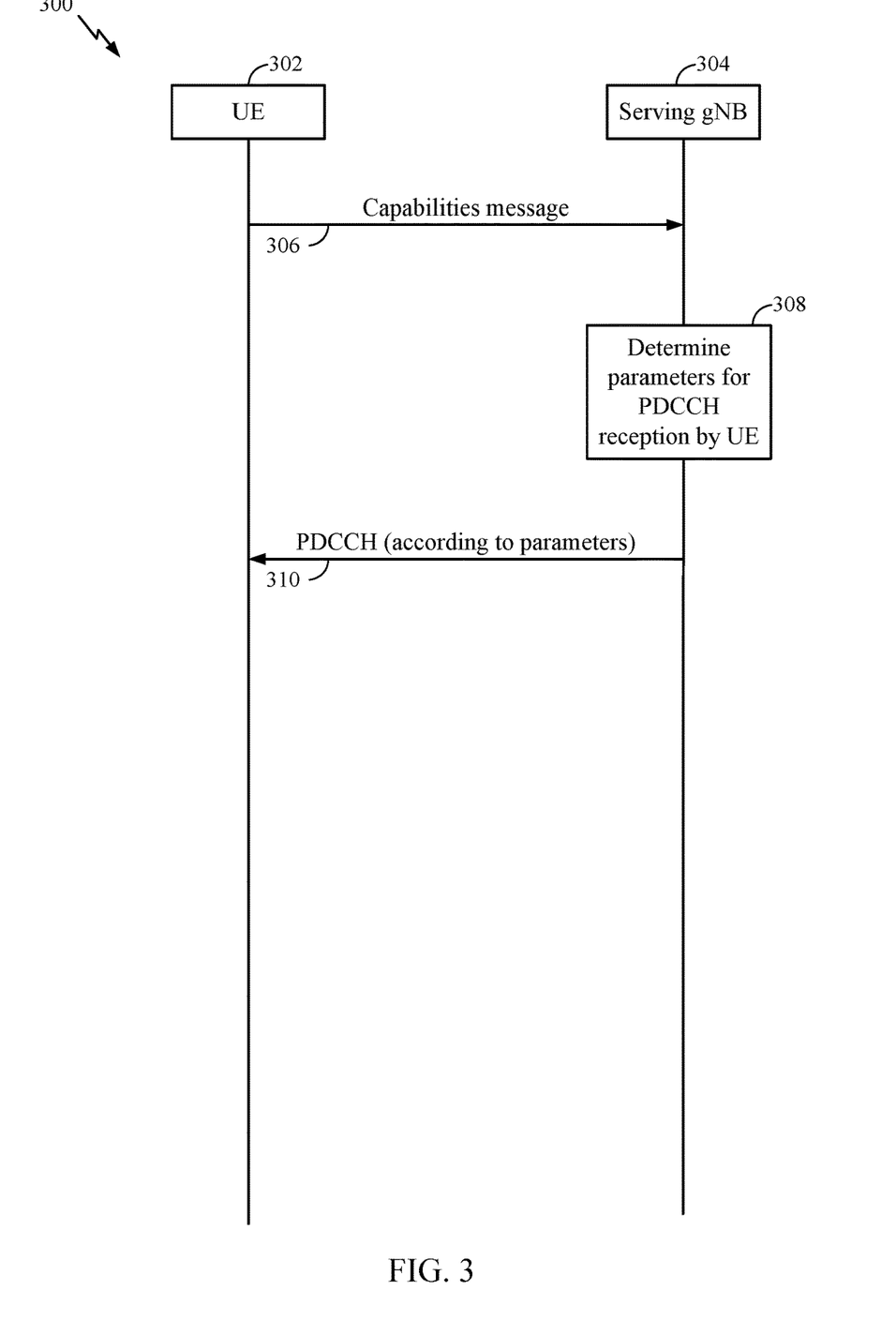
FIG. 3 is an exemplary call flow between a user equipment (UE) and a base station (BS), in accordance with certain aspects of the present disclosure.

FIG. 3 is an exemplary call flow 300, according to aspects of the present disclosure. In the exemplary call flow, a UE 302 (e.g., UE 120, shown in FIGS. 1-2) sends a capabilities message 306 to a serving BS 304 (e.g., BS 110, shown in FIGS. 1-2). The serving BS may be a gNB, in accordance with aspects of the present disclosure. In the capabilities message, the UE signals one or more parameters for PDCCH reception by the UE, for example, by reporting that the UE is a lower tier UE, as described above. At 308, the BS determines the one or more parameters for PDCCH reception signaled by the UE. For example, the BS determines a maximum bandwidth for PDCCH reception for the UE, based on the UE reporting that the UE is a lower tier UE. At 310, the BS transmits a PDCCH to the UE according to the determined parameters for PDCCH reception by the UE.

Figure 4:
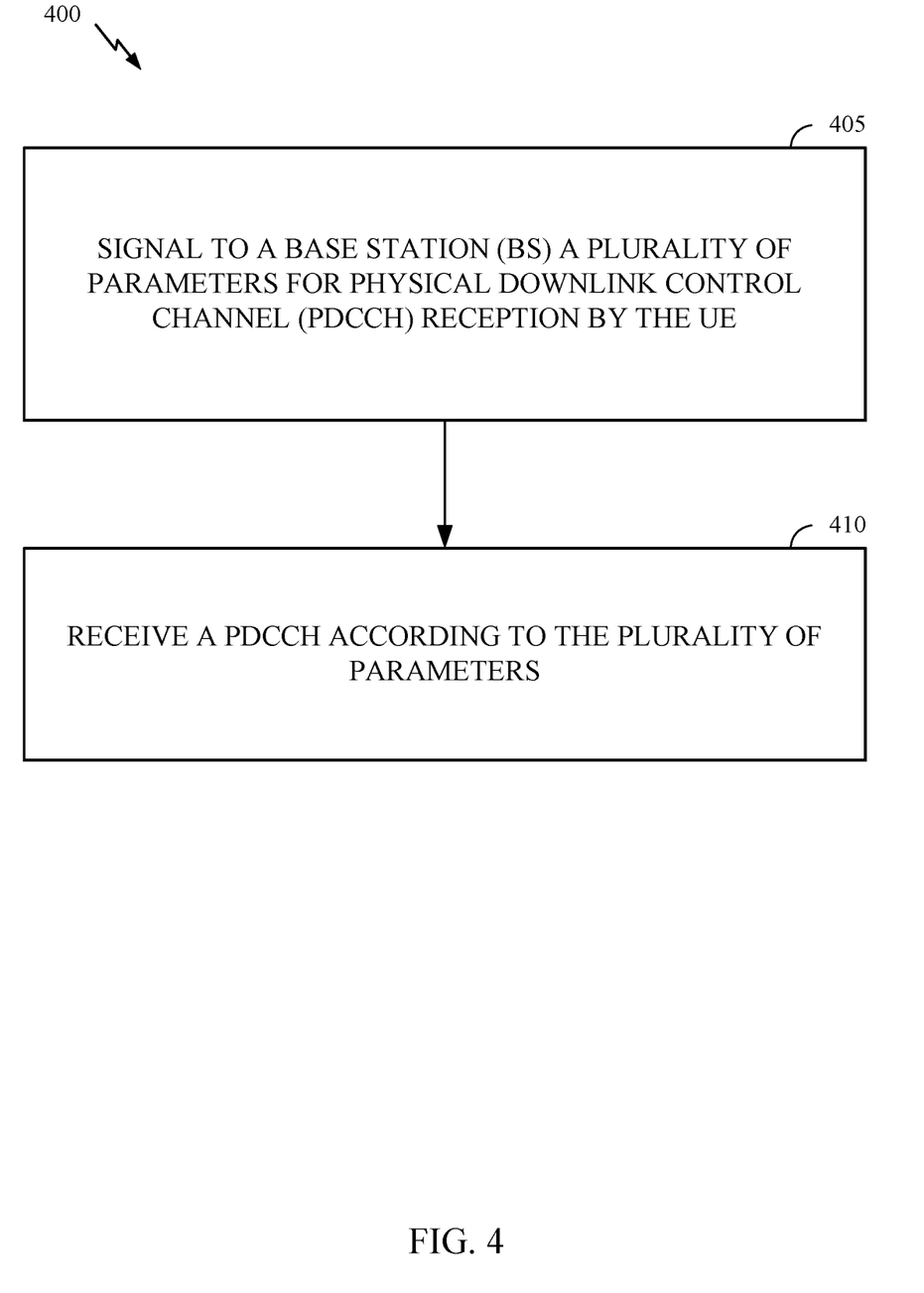
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120 in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, by the UE signaling to a base station (BS) a plurality of parameters for physical downlink control channel (PDCCH) reception by the UE.

At block 410, the operations 400 may continue with the UE receiving a PDCCH according to the plurality of parameters.

According to aspects of the present disclosure, signaling a plurality of parameters for PDCCH reception by the UE (i.e., as described in block 405 above) may include signaling a type of the UE, wherein the type corresponds to the plurality of parameters.

In aspects of the present disclosure, the correspondence between the type of the UE and the plurality of parameters may be predefined in a wireless communications specification.

In previously known techniques (e.g., NR Rel-15), the network may configure a number of BDs and/or CCEs that exceeds the respective BD or CCE limit for a UE. In these previously known techniques, a UE is only required to monitor BDs or CCEs up to the limit reported by the UE. This technique is referred to herein as "PDCCH overbooking."

According to aspects of the present disclosure, the type of the UE may indicate an overbooking capability of the UE.

In aspects of the present disclosure, the type of the UE may indicate a capability of the UE to support non-fallback downlink control information (DCI), such as DCI formats 1_1 and 0_1.

In aspects of the present disclosure, signaling a plurality of parameters for PDCCH reception by the UE (i.e., as described in block 405 above) may include signaling an index that corresponds to the plurality of parameters, wherein the index is selected from a plurality of indices, each index corresponding to a set of the parameters.

According to aspects of the present disclosure, a correspondence between the index and the plurality of parameters may be predefined in a wireless communications specification.

In aspects of the present disclosure, signaling a plurality of parameters for PDCCH reception by the UE (i.e., as described in block 405 above) may include signaling values that correspond to the parameters, wherein the correspondence between the values and the parameters predefined in a wireless communications specification.

According to aspects of the present disclosure, the plurality of parameters may include a maximum supported bandwidth for the PDCCH reception, a maximum supported number of blind decodes (BD) and control channel elements (CCEs) the UE processes, a maximum supported number of downlink control informations (DCIs) the UE buffers, a maximum supported number of DCI sizes, a maximum supported number of DCIs for unicast transmissions or receptions per slot, and/or a maximum supported number of DCIs for unicast transmissions or receptions per span of control symbols.

In aspects of the present disclosure, signaling a plurality of parameters for PDCCH reception by the UE (i.e., as described in block 405 above) may include signaling an indication of an overbooking capability of the UE for the parameters.

According to aspects of the present disclosure, the indication of the overbooking capability of the UE may indicate the UE does not support overbooking.

In aspects of the present disclosure, signaling a plurality of parameters for PDCCH reception by the UE (i.e., as described in block 405 above) may include signaling an indication of a capability of the UE to support non-fallback downlink control information (DCI), such as DCI format 1_1 and 0_1.

According to aspects of the present disclosure, the indication of the capability of the UE to support non-fallback DCI may indicate the UE does not support non-fallback DCI.

In aspects of the present disclosure, signaling a plurality of parameters for PDCCH reception by the UE (i.e., as described in block 405 above) may include transmitting a set of maximum supported bandwidths for the PDCCH reception in a radio resource control (RRC) capabilities message, each maximum supported bandwidth in the set of maximum supported bandwidths corresponding to a combination of a subcarrier spacing (SCS) and a frequency range.

According to aspects of the present disclosure, signaling a plurality of parameters for PDCCH reception by the UE (i.e., as described in block 405 above) may include signaling a maximum supported bandwidth for the PDCCH reception is equal to a maximum supported bandwidth for the UE.

Figure 5:
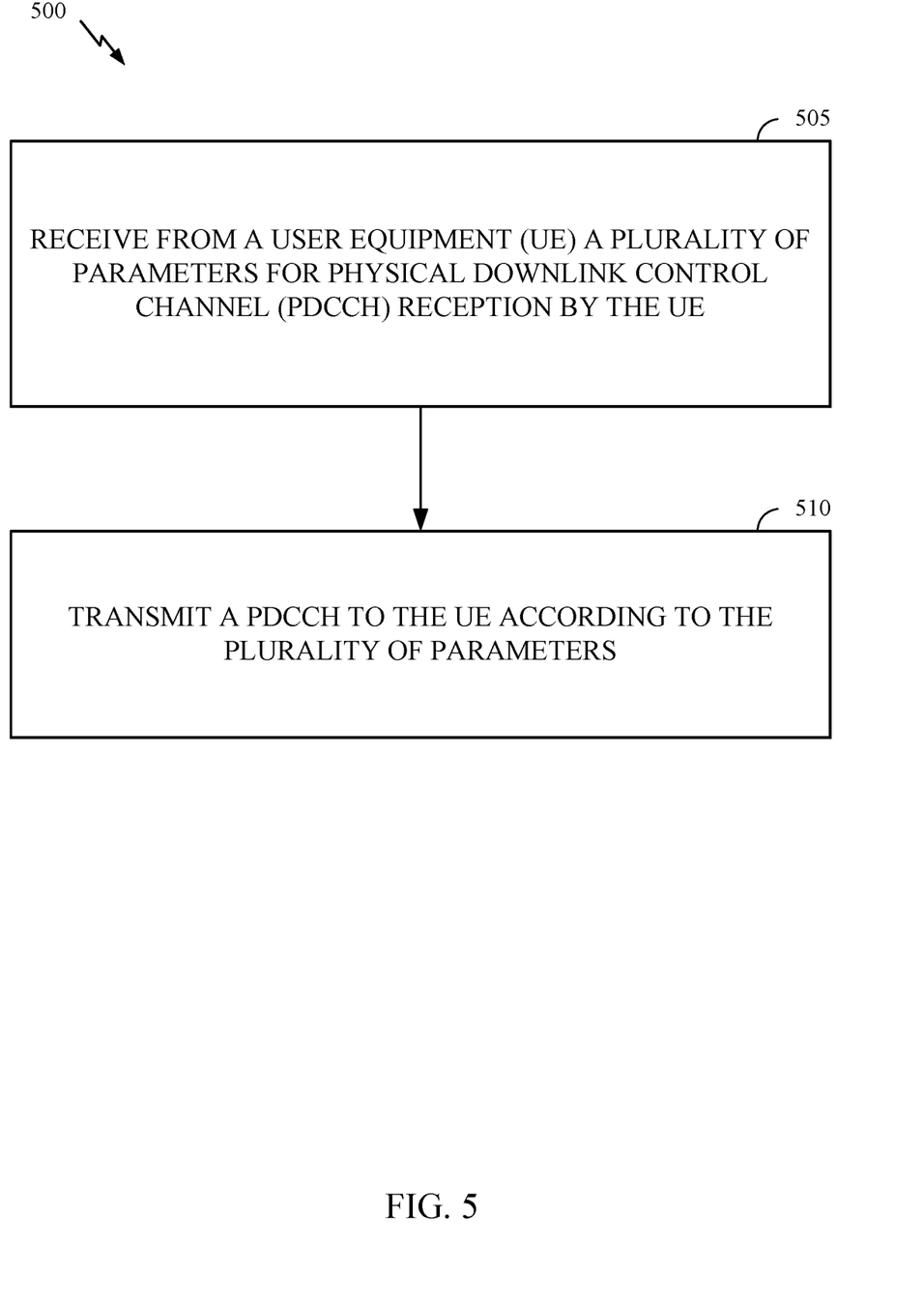
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as a BS 110 in the wireless communication network 100). The operations 500 may be complimentary operations by the BS to the operations 400 performed by a UE. Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 505, with a BS receiving from a user equipment (UE) a plurality of parameters for physical downlink control channel (PDCCH) reception by the UE.

At block 510, operations 500 may continue with the BS transmitting a PDCCH to the UE according to the plurality of parameters.

According to aspects of the present disclosure, receiving a plurality of parameters for PDCCH reception by the UE (i.e., as described in block 505 above) may include receiving a type of the UE, wherein the type corresponds to the plurality of parameters.

In aspects of the present disclosure, the correspondence between the type of the UE and the plurality of parameters may be predefined in a wireless communications specification.

According to aspects of the present disclosure, the type of the UE may indicate an overbooking capability of the UE.

In aspects of the present disclosure, the type of the UE may indicate a capability of the UE to support non-fallback downlink control information (DCI), such as DCI formats 1_1 and 0_1.

According to aspects of the present disclosure, receiving a plurality of parameters for PDCCH reception by the UE (i.e., as described in block 505 above) may include receiving an index that corresponds to the plurality of parameters, and the BS may then determine each of the parameters in the plurality of parameters based on the index, wherein the index is selected from a plurality of indices, each index corresponding to a set of the parameters.

In aspects of the present disclosure, a correspondence between the index and the plurality of parameters may be predefined in a wireless communications specification.

In aspects of the present disclosure, receiving a plurality of parameters for PDCCH reception by the UE (i.e., as described in block 505 above) may include receiving values that correspond to the parameters, wherein the correspondence between the values and the parameters is predefined in a wireless communications specification.

According to aspects of the present disclosure, the plurality of parameters (i.e., the parameters mentioned in blocks 505 and 510 above) may include a maximum supported bandwidth for the PDCCH reception, a maximum supported number of blind decodes (BD) and control channel elements (CCEs) the UE processes, a maximum supported number of downlink control informations (DCIs) the UE buffers, a maximum supported number of DCI sizes, a maximum supported number of DCIs for unicast transmissions or receptions per slot, and/or a maximum supported number of DCIs for unicast transmissions or receptions per span of control symbols.

In aspects of the present disclosure, receiving a plurality of parameters for PDCCH reception by the UE (i.e., as described in block 505 above) may include receiving an indication of an overbooking capability of the UE for the parameters.

According to aspects of the present disclosure, the indication of the overbooking capability of the UE indicates the UE does not support overbooking.

In aspects of the present disclosure, receiving a plurality of parameters for PDCCH reception by the UE (i.e., as described in block 505 above) receiving an indication of a capability of the UE to support non-fallback downlink control information (DCI).

According to aspects of the present disclosure, the indication of the capability of the UE to support non-fallback DCI indicates the UE does not support non-fallback DCI.

In aspects of the present disclosure, receiving a plurality of parameters for PDCCH reception by the UE (i.e., as described in block 505 above) may include receiving a set of maximum supported bandwidths for the PDCCH reception in a radio resource control (RRC) capabilities message, with each maximum supported bandwidth in the set of maximum supported bandwidths corresponding to a combination of a subcarrier spacing (SCS) and a frequency range.

According to aspects of the present disclosure, receiving a plurality of parameters for PDCCH reception by the UE (i.e., as described in block 505 above) may include receiving an indication that a maximum supported bandwidth for the PDCCH reception is equal to a maximum supported bandwidth for the UE.

Figure 6:
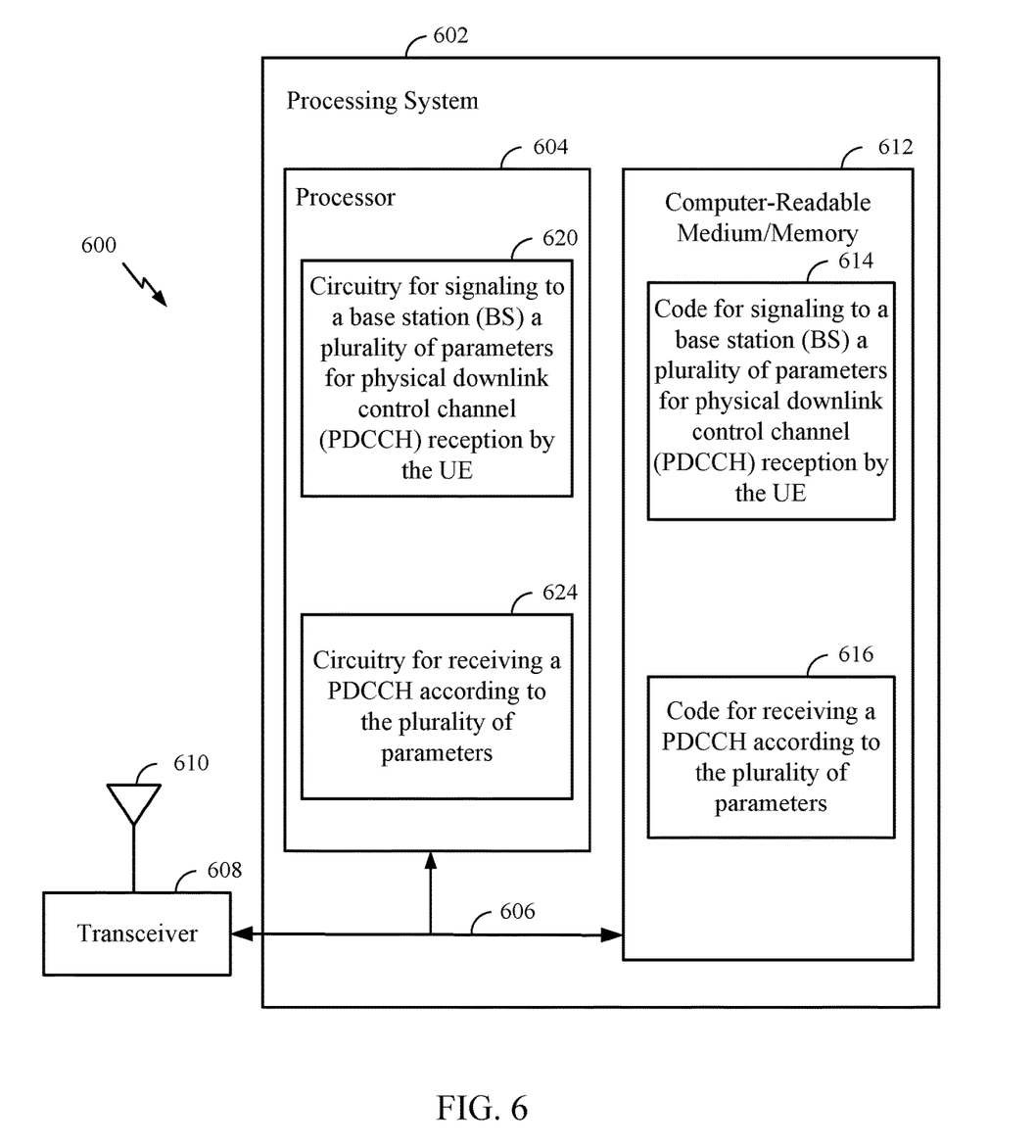
FIG. 6 illustrates a communications device that may include various components configured to perform operations for the techniques disclosed in FIG. 4, in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4, or other operations for performing the various techniques discussed herein for low-complexity PDCCHs. In certain aspects, computer-readable medium/memory 612 stores code 614 for signaling to a base station (BS) a plurality of parameters for physical downlink control channel (PDCCH) reception by the communications device and code 616 for receiving a PDCCH according to the plurality of parameters. In certain aspects, the processor 604 has circuitry configured to implement the code stored in the computer-readable medium/memory 612. The processor 604 includes circuitry 620 for signaling to a base station (BS) a plurality of parameters for physical downlink control channel (PDCCH) reception by the communications device and circuitry 624 for receiving a PDCCH according to the plurality of parameters.

Figure 7:
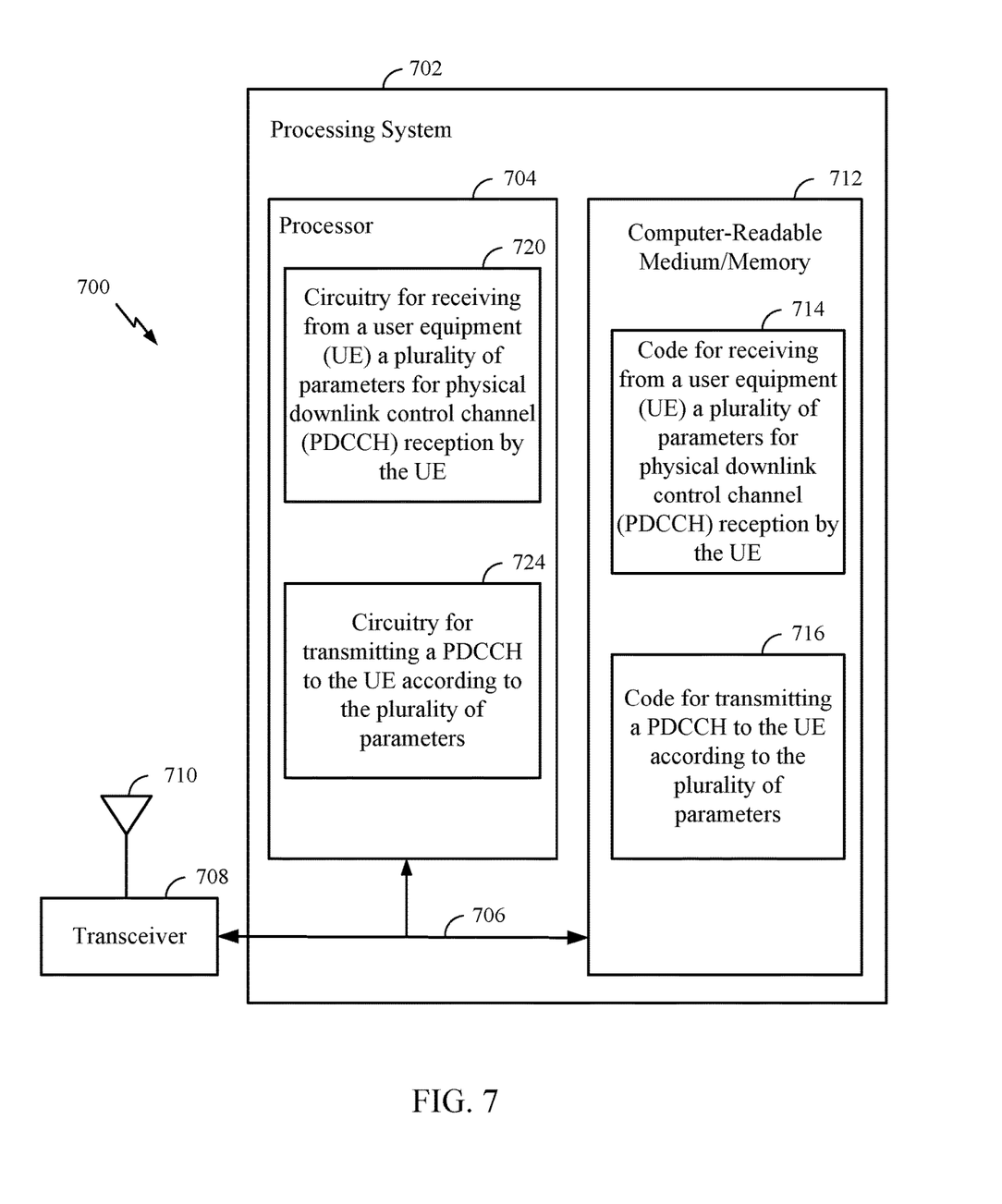
FIG. 7 illustrates a communications device that may include various components configured to perform operations for the techniques disclosed in FIG. 5, in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for low-complexity PDCCHs. In certain aspects, computer-readable medium/memory 712 stores code 714 for receiving from a user equipment (UE) a plurality of parameters for physical downlink control channel (PDCCH) reception by the UE and code 716 for transmitting a PDCCH according to the plurality of parameters. In certain aspects, the processor 704 has circuitry configured to implement the code stored in the computer-readable medium/memory 712. The processor 704 includes circuitry 720 receiving from a user equipment (UE) a plurality of parameters for physical downlink control channel (PDCCH) reception by the UE and circuitry 724 for receiving a PDCCH according to the plurality of parameters.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1: A method for wireless communications by a user equipment (UE), comprising signaling to a base station (BS) a plurality of parameters for physical downlink control channel (PDCCH) reception by the UE and receiving a PDCCH according to the plurality of parameters.

Embodiment 2: The method of Embodiment 1, wherein the signaling comprises signaling a type of the UE, wherein the type corresponds to the plurality of parameters.

Embodiment 3: The method of Embodiment 2, wherein the correspondence between the type of the UE and the plurality of parameters is predefined in a wireless communications specification.

Embodiment 4: The method of Embodiment 2, wherein the type of the UE indicates an overbooking capability of the UE.

Embodiment 5: The method of Embodiment 2, wherein the type of the UE indicates a capability of the UE to support non-fallback downlink control information (DCI).

Embodiment 6: The method of any of Embodiments 1-5, wherein the signaling comprises signaling an index that corresponds to the plurality of parameters, wherein the index is selected from a plurality of indices, each index corresponding to a set of the parameters.

Embodiment 7: The method of Embodiment 6, wherein the correspondence between the index and the plurality of parameters is predefined in a wireless communications specification.

Embodiment 8: The method of any of Embodiments 1-7, wherein the signaling comprises signaling values that correspond to the parameters, wherein the correspondence between the values and the parameters are predefined in a wireless communications specification.

Embodiment 9: The method of any of Embodiments 1-8, wherein the plurality of parameters comprises a maximum supported bandwidth for the PDCCH reception, a maximum supported number of blind decodes (BD) and control channel elements (CCEs) the UE processes, a maximum supported number of downlink control informations (DCIs) the UE buffers, a maximum supported number of DCI sizes, a maximum supported number of DCIs for unicast transmissions or receptions per slot, and/or a maximum supported number of DCIs for unicast transmissions or receptions per span of control symbols.

Embodiment 10: The method of any of Embodiments 1-9, wherein the signaling comprises an indication of an overbooking capability of the UE for the parameters.

Embodiment 11: The method of Embodiment 10, wherein the indication of the overbooking capability of the UE indicates the UE does not support overbooking.

Embodiment 12: The method of any of Embodiments 1-11, wherein the signaling comprises signaling an indication of a capability of the UE to support non-fallback downlink control information (DCI).

Embodiment 13: The method of Embodiment 12, wherein the indication of the capability of the UE to support non-fallback DCI indicates the UE does not support non-fallback DCI.

Embodiment 14: The method of any of Embodiments 1-13, wherein signaling the plurality of parameters comprises transmitting a set of maximum supported bandwidths for the PDCCH reception in a radio resource control (RRC) capabilities message, each maximum supported bandwidth in the set of maximum supported bandwidths corresponding to a combination of a subcarrier spacing (SCS) and a frequency range.

Embodiment 15: The method of any of Embodiments 1-14, wherein signaling the plurality of parameters comprises: signaling a maximum supported bandwidth for the PDCCH reception is equal to a maximum supported bandwidth for the UE.

Embodiment 16: A method for wireless communications by a base station (BS), comprising receiving from a user equipment (UE) a plurality of parameters for physical downlink control channel (PDCCH) reception by the UE and transmitting a PDCCH to the UE according to the plurality of parameters.

Embodiment 17: The method of Embodiment 16, wherein the receiving comprises receiving a type of the UE, wherein the type corresponds to the plurality of parameters.

Embodiment 18: The method of Embodiment 17, wherein the correspondence between the type of the UE and the plurality of parameters is predefined in a wireless communications specification.

Embodiment 19: The method of Embodiment 17, wherein the type of the UE indicates an overbooking capability of the UE.

Embodiment 20: The method of Embodiment 17, wherein the type of the UE indicates a capability of the UE to support non-fallback downlink control information (DCI).

Embodiment 21: The method of any of Embodiments 16-20, wherein the receiving comprises receiving an index that corresponds to the plurality of parameters, and the method further comprises determining each of the parameters in the plurality of parameters based on the index, wherein the index is selected from a plurality of indices, each index corresponding to a set of the parameters.

Embodiment 22: The method of Embodiment 21, wherein the correspondence between the index and the plurality of parameters is predefined in a wireless communications specification.

Embodiment 23: The method of any of Embodiments 16-22, wherein the receiving comprises receiving values that correspond to the parameters, wherein the correspondence between the values and the parameters is predefined in a wireless communications specification.

Embodiment 24: The method of any of Embodiments 16-23, wherein the plurality of parameters includes a maximum supported bandwidth for the PDCCH reception, a maximum supported number of blind decodes (BD) and control channel elements (CCEs) the UE processes, a maximum supported number of downlink control informations (DCIs) the UE buffers, a maximum supported number of DCI sizes, a maximum supported number of DCIs for unicast transmissions or receptions per slot, and/or a maximum supported number of DCIs for unicast transmissions or receptions per span of control symbols.

Embodiment 25: The method of any of Embodiments 16-24, wherein the receiving comprises receiving an indication of an overbooking capability of the UE for the parameters.

Embodiment 26: The method of Embodiment 25, wherein the indication of the overbooking capability of the UE indicates the UE does not support overbooking.

Embodiment 27: The method of any of Embodiments 16-26, wherein the receiving comprises receiving an indication of a capability of the UE to support non-fallback downlink control information (DCI).

Embodiment 28: The method of Embodiment 27, wherein the indication of the capability of the UE to support non-fallback DCI indicates the UE does not support non-fallback DCI.

Embodiment 29: The method of any of Embodiments 16-28, wherein receiving the plurality of parameters comprises receiving a set of maximum supported bandwidths for the PDCCH reception in a radio resource control (RRC) capabilities message, each maximum supported bandwidth in the set of maximum supported bandwidths corresponding to a combination of a subcarrier spacing (SCS) and a frequency range.

Embodiment 30: The method of any of Embodiments 16-29, wherein receiving the plurality of parameters comprises receiving an indication that a maximum supported bandwidth for the PDCCH reception is equal to a maximum supported bandwidth for the UE.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 4-5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment (UE), comprising:
    signaling to a base station (BS) an index that corresponds to a plurality of parameters for physical downlink control channel (PDCCH) reception by the UE, wherein the index is selected from a plurality of indices, and wherein each index of the plurality of indices corresponds to a set of values of the plurality of parameters, wherein the plurality of parameters indicate a capability of the UE with respect to blind decoding the PDCCH; and
    receiving a PDCCH according to the plurality of parameters.

2. The method of claim 1, wherein the signaling comprises signaling a type of the UE, wherein the type corresponds to the plurality of parameters.

3. The method of claim 2, wherein the correspondence between the type of the UE and the plurality of parameters is predefined in a wireless communications specification.

4. The method of claim 2, wherein the type of the UE indicates an overbooking capability of the UE.

5. The method of claim 2, wherein the type of the UE indicates a capability of the UE to support non-fallback downlink control information (DCI).

6. The method of claim 1, wherein the correspondence between the index and the plurality of parameters is predefined in a wireless communications specification.

7. The method of claim 1, wherein the signaling comprises signaling values that correspond to the parameters, wherein the correspondence between the values and the parameters is predefined in a wireless communications specification.

8. The method of claim 1, wherein the plurality of parameters comprises:
a maximum supported bandwidth for the PDCCH reception,
a maximum supported number of blind decodes (BD) and control channel elements (CCEs) the UE processes,
a maximum supported number of downlink control informations (DCIs) the UE buffers,
a maximum supported number of DCI sizes,
a maximum supported number of DCIs for unicast transmissions or receptions per slot, and
a maximum supported number of DCIs for unicast transmissions or receptions per span of control symbols.

9. The method of claim 1, wherein the signaling comprises signaling an indication of an overbooking capability of the UE for the parameters.

10. The method of claim 9, wherein the indication of the overbooking capability of the UE indicates the UE does not support overbooking.

11. The method of claim 1, wherein the signaling comprises signaling an indication of a capability of the UE to support non-fallback downlink control information (DCI).

12. The method of claim 1, wherein the signaling comprises signaling an indication that the UE does not support non-fallback downlink control information (DCI).

13. The method of claim 1, wherein signaling the plurality of parameters comprises:
transmitting a set of maximum supported bandwidths for the PDCCH reception in a radio resource control (RRC) capabilities message, each maximum supported bandwidth in the set of maximum supported bandwidths corresponding to a combination of a subcarrier spacing (SCS) and a frequency range.

14. The method of claim 1, wherein signaling the plurality of parameters comprises:
signaling a maximum supported bandwidth for the PDCCH reception is equal to a maximum supported bandwidth for the UE.

15. A method for wireless communications performed by a base station (BS), comprising:
receiving from a user equipment (UE) an index that corresponds to a plurality of parameters for physical downlink control channel (PDCCH) reception by the UE, wherein the index is selected from a plurality of indices, and wherein each index of the plurality of indices corresponds to a set of values of the plurality of parameters, wherein the plurality of parameters indicate a capability of the UE with respect to blind decoding the PDCCH; and
transmitting a PDCCH to the UE according to the plurality of parameters.

16. The method of claim 15, wherein the receiving comprises receiving a type of the UE, wherein the type corresponds to the plurality of parameters.

17. The method of claim 16, wherein the correspondence between the type of the UE and the plurality of parameters is predefined in a wireless communications specification.

18. The method of claim 16, wherein the type of the UE indicates an overbooking capability of the UE.

19. The method of claim 16, wherein the type of the UE indicates a capability of the UE to support non-fallback downlink control information (DCI).

20. The method of claim 15, further comprising:
determining each of the parameters in the plurality of parameters based on the index.

21. The method of claim 20, wherein the correspondence between the index and the plurality of parameters is predefined in a wireless communications specification.

22. The method of claim 15, wherein the receiving comprises receiving values that correspond to the parameters, wherein the correspondence between the values and the parameters is predefined in a wireless communications specification.

23. The method of claim 15, wherein the plurality of parameters comprises:
a maximum supported bandwidth for the PDCCH reception,
a maximum supported number of blind decodes (BD) and control channel elements (CCEs) the UE processes,
a maximum supported number of downlink control informations (DCIs) the UE buffers,
a maximum supported number of DCI sizes,
a maximum supported number of DCIs for unicast transmissions or receptions per slot, and
a maximum supported number of DCIs for unicast transmissions or receptions per span of control symbols.

24. The method of claim 15, wherein the receiving comprises receiving an indication of an overbooking capability of the UE for the parameters.

25. The method of claim 24, wherein the indication of the overbooking capability of the UE indicates the UE does not support overbooking.

26. The method of claim 15, wherein the receiving comprises receiving an indication of a capability of the UE to support non-fallback downlink control information (DCI).

27. The method of claim 15, wherein the receiving comprises receiving an indication that the UE does not support non-fallback downlink control information (DCI).

28. The method of claim 15, wherein receiving the plurality of parameters comprises:
receiving a set of maximum supported bandwidths for the PDCCH reception in a radio resource control (RRC) capabilities message, each maximum supported bandwidth in the set of maximum supported bandwidths corresponding to a combination of a subcarrier spacing (SCS) and a frequency range.

29. The method of claim 15, wherein receiving the plurality of parameters comprises:
receiving an indication that a maximum supported bandwidth for the PDCCH reception is equal to a maximum supported bandwidth for the UE.

* * * * *